(12) United States Patent
Keskitalo et al.

(10) Patent No.: US 7,403,748 B1
(45) Date of Patent: Jul. 22, 2008

(54) MULTI-ANTENNA TRANSMISSION METHOD AND SYSTEM

(75) Inventors: Ilkka Keskitalo, Oulu (FI); Juha Ylitalo, Oulu (FI); Marcos Katz, Oulu (FI)

(73) Assignee: Nokia Coporation, Espoo (FI)

( * ) Notice: Subject to any disclaimer, the term of this patent is extended or adjusted under 35 U.S.C. 154(b) by 0 days.

(21) Appl. No.: 10/240,628

(22) PCT Filed: Apr. 7, 2000

(86) PCT No.: PCT/EP00/03137

§ 371 (c)(1),
(2), (4) Date: Dec. 30, 2002

(87) PCT Pub. No.: WO01/78254

PCT Pub. Date: Oct. 18, 2001

(51) Int. Cl.
*H04B 7/02* (2006.01)
*H04B 17/00* (2006.01)
(52) U.S. Cl. .................................. 455/101; 455/67.11
(58) Field of Classification Search ................. 455/101, 455/67.11, 69, 67.16, 562.1, 67.14, 68, 276.1, 455/114.2–114.3, 115, 118, 222, 225, 226.1, 455/452.2, 453, 436, 437, 438, 112, 114.1; 375/267, 152, 148; 370/229, 230, 231–236, 370/236.1
See application file for complete search history.

(56) References Cited

U.S. PATENT DOCUMENTS 6,714,514 B1 * 3/2004 Espax et al. ................. 370/230
6,754,473 B1 * 6/2004 Choi et al. ................... 455/101
2002/0009156 A1 * 1/2002 Hottinen et al. ............. 375/267
2002/0131381 A1 * 9/2002 Kim et al. .................... 370/335
2004/0190603 A1 * 9/2004 Dabak et al. ................. 375/148

FOREIGN PATENT DOCUMENTS

| EP | 0 755 127 A2 | 1/1997 |
| EP | 0 966 125 A1 | 12/1999 |
| WO | WO 00/01078 | 1/2000 |
| WO | WO00/41339 | 7/2000 |

OTHER PUBLICATIONS

"Universal Mobile Telecommunications System (UTMS); Physical channels and mapping of transport onto physical channels (FDD) (3G tS 25.211 version 3.1.1 Release 1999)" ETSI TS 125 211 V3.1.1 (Jan. 2000), XP002151815, p. 15, line 4-p. 22, line 12.

* cited by examiner

*Primary Examiner*—Melody Mehrpour
(74) *Attorney, Agent, or Firm*—Harrington & Smith, PC

(57) ABSTRACT

The present invention relates to a method and system for transmitting a transmission signal from an antenna array (19) to a receiving means (20) of a wireless communication system, wherein a signal quality measurement is performed at the receiving means (20) for predetermined antennas or beams of said antenna array (19). Based on a feedback information derived from the signal quality measurement, at least two of the predetermined antennas or beams of the antenna array (19) are selected. The selected antennas or beams are used for transmitting said transmission signal according to a transmit diversity or beamforming scheme. Thus, spectral efficiency and diversity gain can be enhanced by using only selected ones of the predetermined antennas or beams.

57 Claims, 5 Drawing Sheets

| mode | $N_{FB}$ | $N_W$ | feedback bit rate | Na | Np |
|---|---|---|---|---|---|
| TxAA mode 1 | 1 | 2 | 1500bps | 0 | 2 |
| TxAA mode 2 | 1 | 4 | 1500bps | 1 | 3 |

| Div. mode | FSM [bits] | channel selection | ch. ctrl [bits] | FSMs / frame | |
|---|---|---|---|---|---|
| | | | | 1 FBI bit/slot | 2 FBI bits/slot |
| STTD | 3 | 3 | - | 5 | 10 |
| STTD* | 1 | 1 | - | 15 | 30 |
| TxAA mode 1 | 4 | 3 | 1 | 4 | 8 |
| TxAA mode 1* | 2 | 1 | 1 | 8 | 15 |
| TxAA mode 2 | 7 | 3 | 4 | 2 | 4 |
| TxAA mode 2* | 5 | 1 | 4 | 3 | 6 |

MULTI-ANTENNA TRANSMISSION METHOD AND SYSTEM

PRIORITY CLAIM

This is a national stage of PCT application No. PCT/EP00/03137, filed on Apr. 7, 2000. Priority is claimed on that application.

FIELD OF THE INVENTION

The present invention relates to a multi-antenna transmission method and system for a wireless communication system such as the Universal Mobile Telecommunications System (UMTS).

BACKGROUND OF THE INVENTION

Wideband Code Division Multiple Access (WCDMA) has been chosen as the radio technology for the paired bands of the UMTS. Consequently, WCDMA is the common radio technology standard for third-generation wide-area mobile communications. WCDMA has been designed for high-speed data services and, more particularly, Internet-based packet-data offering up to 2 Mbps in indoor environments and over 384 kbps for wide-area.

The WCDMA concept is based on a new channel structure for all layers built on technologies such as packet-data channels and service multiplexing. The new concept also includes pilot symbols and a time-slotted structure which has led to the provision of adaptive antenna arrays which direct antenna beams at users to provide maximum range and minimum interference. This is also crucial when implementing wideband technology where limited radio spectrum is available.

The uplink capacity of the proposed WCDMA systems can be enhanced by various techniques including multi-antenna reception and multi-user detection or interference cancellation. Techniques that increase the downlink capacity have not been developed with the same intensity. However, the capacity demand imposed by the projected data services (e.g. Internet) burdens more heavily the downlink channel. Hence, it is important to find techniques that improve the capacity of the downlink channel.

Bearing in mind the strict complexity requirements of terminals, and the characteristics of the downlink channel, the provision of multiple receive antennas is not a desired solution to the downlink capacity problem. Therefore, alternative solutions have been proposed suggesting that multiple antennas or transmit diversity at the base station will increase downlink capacity with only minor increase of complexity in terminal implementation.

The transmit diversity concept adopted for the FDD (Frequency Division Duplex) mode of third generation WCDMA system in the 3G standardization is currently being optimized for the case of two transmitting antennas at the base station.

In case of a so-called open-loop mode, a space-time block code is applied for the two transmitting antennas. The channel symbols are divided into two-element blocks which are transmitted from a first and second antenna, respectively, at successive time instants. These symbols are transmitted using the same spreading code. The receiver then uses a linear orthogonal processing based on the estimated channel coefficients to detect the transmitted symbols.

Alternatively, in case of a so-called closed-loop mode, a weight information is fed back from the terminals to the base station to approximate matched beamforming. FIG. 1 shows an example of such a closed-loop or feedback mode for a downlink transmission between a base station (BS) 10 and a mobile terminal or mobile station (MS) 20. In particular, the BS 10 comprises two antennas A1 and A2, and the MS 20 is arranged to estimate the channel on the basis of pilot channel signals used to probe the downlink channel and transmitted from the two antennas A1 and A2. Then, the MS 20 feeds back the discretized or quantized channel estimate to the BS 10. The antennas (or antenna elements) A1 and A2 are spaced sufficiently close to each other, so that the propagation delays between each of the antennas A1 and A2 and the MS 20 are approximately identical (within a fraction of a duration of a chip of the WCDMA spreading code). This is important in order to maintain downlink orthogonality in a single-path channel. Naturally, it is desired to develop a robust and low-delay feedback signaling concept.

Transmit diversity techniques provide a low-cost solution to increase downlink capacity in third generation systems. A number of different transmit diversity concepts have been developed. Both open and closed-loop concepts have significant merits in different environments and with different service assumptions.

In WCDMA, different modes have been suggested for the open-loop and closed-loop concepts which are optimized for two antennas. According to the open-loop Space-Time Transmit Diversity (STTD) mode, a two bit space-time code is used for transmission via the two antennas A1 and A2. Furthermore, closed-loop modes 1 and 2 (referred to as Transmission Antenna Array (TxAA) modes) have been specified, where feedback weights used for controlling power and/or phase of the transmission signals of the two antennas A1 and A2 are modified after a certain number of slots. The MS 20 estimates channel coefficients from common pilot signals (antenna or beam specific), wherein a simple dedicated channel estimate is derived from continuous common channel estimates. In particular, a quantized feedback is signaled to the BS 10 using the 1.5 kbps subchannel. In mode 1, the possible Tx feedback weights are selected from a QPSK constellation. In mode 2, the possible Tx feedback weights are selected from a 16-state constellation.

FIG. 2 shows a table indicating characteristic parameters of the above TxAA modes. In particular, $N_{FB}$ designates the number of feedback bits per time slot, $N_W$ the number of bits per feedback signaling word, Na the number of feedback bits for controlling an amplification or power at the antennas A1 and A2, and $N_p$ the number of feedback bits for controlling a phase difference between the antennas A1 and A2. As can be gathered from the table of FIG. 2, one bit is fed back per time slot in each of the feedback modes.

In the Tx AA mode 1, the feedback signaling word comprises two bits, and an update is performed after both feedback bits have been received, i.e. after two time slots. The feedback signaling word is only used for controlling the phase difference between the two antennas A1 and A2.

In the Tx AA mode 2, the bit length of the feedback signaling word is four, and an update is performed every four time slots. In particular, one bit of the feedback signaling word is used for controlling the amplification (power) at the antennas A1 and A2, and three bits are used for controlling their phase difference.

The required channel estimates are obtained e.g. from the common pilot channel signal transmitted with a known power from each antenna. In WCDMA systems, rather accurate estimates can be obtained by using the common channel pilots (CPICH) transmitted continuously from the two antennas A1 and A2. The feedback information can be transmitted in the Feedback Signaling Message (FSM) as a part of the FBI field of the uplink dedicated physical control channel (DPCCH).

It is to be noted that the STTD and TxAA modes may be implemented in an analogous manner in the beam domain. In the TxAA case, the MS 20 signals to the BS 10 whether to rotate the phase angle of channel signals transmitted from the antenna A2 by 180°. Then, the BS 10 transmits simultaneously from both antennas A1 and A2.

In the TxAA modes 1 and 2, the MS 20 transmits estimated and quantized channel parameters to the BS 10 which then weights the transmitted signals accordingly. Thus, a higher resolution than 180° (as provided by the STTD mode) can be achieved. The MS 20 selects the Tx weight (or Tx beam) from 4 or 16 different constellations, respectively.

As regards the table of FIG. 2, it is to be noted that an equal power is applied to the antennas A1 and A2 in the case where Na=0. Furthermore, the antennas A1 and A2 are uniquely defined by their respective pilot codes of the CCPCH (Common Control Physical Channel) of the UMTS. The derived amplitude and phase applied to the antennas A1 and A2 is called a weight and the set of weights is grouped into a weight vector. Specifically, the weight vector for the present case of two antennas is given by $$w = \begin{bmatrix} \sqrt{PA1} \\ \sqrt{PA2} \cdot \exp(j\pi\Delta\varphi/180) \end{bmatrix}$$

wherein $\Delta\phi$ denotes the phase difference (phase weight) fed back to the BS 10. If more than two antennas, i.e. an antenna array, is used, the dimension of w becomes larger than two. In this case, a directional antenna may be achieved by using relative phases between antennas. The estimated phase of the feedback signal in the complex plane is then used for controlling the transmit direction.

Extensions to the above two-element concepts are considered in order to further increase the diversity gain. While many of these extensions are straightforward, most of them are applicable only in very low mobility environments, since the accuracy (or delay) of the feedback signaling is often compromised. In addition, it has to be considered that unnecessary transmissions might be performed if the channels of the corresponding antennas are in deep fades.

The basic application of 2-antenna or 2-beam Tx-diversity requires a doubling of the transmission power. This means that the diversity gain should exceed 3 dB in order to obtain a total diversity gain. From W. D. Jakes, "Microwave mobile communications", IEEE Press, 1974, it is known that in a flat-fading channel with two, three, or four uncorrelated signal paths the gain (at 95% reliability level) compared to one-path reception is 8.5 dB, 12 dB, and 14.5 dB, respectively. Thus, the achievable Tx-diversity gain is approximately 5.5 dB when transmitting with two antennas instead of one, 1.5 dB with three antennas instead of two, and 1.5 dB with four antennas instead of three. This analysis was conducted for frequency non-selective channels, typically for micro-cells and indoor cases, assuming ideal feedback, channel estimation, combining and transmission. In frequency selective cases, the Rake receiver already exploits multipath (delay) diversity and hence the above gains of using multi-antenna or multi-beam diversity are reduced.

Moreover, the following problem associated with channel estimation has to be taken into account. If M antennas are used, the average transmission power of each antenna is reduced to P/M, wherein P denotes the total power required for the transmission. If m is large, the power per antenna is low and thus the performance of the channel estimation operation at the receiver will suffer due to the low SNR (Signal to Noise Ratio).

SUMMARY OF THE INVENTION

It is therefore an object of the present invention to provide a multi-antenna transmission method and system by means of which the transmission gain can be increased while maintaining a good channel estimation performance.

This object is achieved by a method for transmitting a transmission signal from an antenna array to a receiving means of a wireless communication system, said method comprising the steps of:

performing a signal quality measurement at said receiving means for predetermined antennas or beams of said antenna array;

selecting at least two of said predetermined antennas or beams of said antenna array based on a feedback information derived from said signal quality measurement; and using said at least two selected antennas or beams for transmitting said transmission signal according to a transmit diversity or beamforming scheme.

Additionally, the above object is achieved by a system for transmitting a transmission signal from an antenna array to a receiving means of a wireless communication system, said system comprising:

measuring means for performing a signal quality measurement at said receiving means for predetermined antennas or beams of said antenna array;

selection means for selecting at least two of said predetermined antennas or beams of said antenna array based on a feedback information derived from said signal quality measurement; and transmitting means for transmitting said transmission signal using said at least two selected antennas or beams according to a transmit diversity or beamforming scheme.

Accordingly, the best antennas are selected from the antenna array and used to transmit the transmission signal so as to perform a transmit diversity transmission or a beamforming operation. Thus, the chance that the corresponding selected channels (i.e. antennas or beams) are good can be increased with the number of predetermined channels (i.e. antennas or beams) based on which the selection is performed. Thus, the transmission gain approaches that of a space-time coding scheme using the predetermined number of channels, while the actual signal transmission is performed by using only the selected channels. The receiver uses the channel impulse response of the selected best received channels in the subsequent feedback control. After the initial selection based on the predetermined number of channels (e.g. all channels), the total power is supplied to the best channels, i.e. to transmit the transmission signal via the selected best channels. Thereby, power efficiency and channel power available for performing the channel estimation can be increased.

The at least two selected antennas or beams may be controlled at least in part based on another feedback information received from said receiving means. Thus, the same procedures can be used for transmit diversity and beamforming cases. Only the parameters at the transmission end have to be changed (e.g. redefinition of the received FSMs). In the beamforming case, the feedback control (closed-loop diversity) on the basis of the other feedback information leads to a digital or stepwise beamforming. Thus, the advantages of digital beamforming (e.g. reduced cusping loss due to elimination of fixed beam worst case) can be obtained without the need of calibration at the transmitting end.

Since the feedback information and the other feedback information can be signaled using existing functions of the receiving user equipment (e.g. mobile station), the user equipments do not have to be modified, at least not to a large extent. The receiver even does not have to know which kind of antenna control is performed. Thereby, diversity and antenna gain can be adapted to different propagation environments. In micro cell environments (i.e. small cell areas), diversity is preferred due to the small delay spread and typically large angular spread of the mobile stations located in the corresponding cell area. In macro cell environments (i.e. large cell areas), the radio channel typically provides "enough" path-diversity, such that capacity and coverage improvements can be achieved by a beamforming operation (i.e. increasing the antenna gain e.g. by directing the transmission beam towards the mobile station).

Preferably, the other feedback information is generated based on a channel estimation using respective pilot signals transmitted via said at least two selected antennas or beams. The respective pilot signals may be transmitted via the CPICH of a WCDMA system.

The signal quality measurement may also be performed by measuring a signal strength, SNR or SIR (Signal to Interference Ratio) using respective pilot signals transmitted via each of said predetermined antenna elements or beams. Thus, all pilot signals of the channels from which the selection is performed are only transmitted for measuring purposes, such that the average power of the pilot signals of the selected channels is increased. Preferably, the respective pilot signals required for the measuring are transmitted via a secondary pilot channel, such as the S-CPICH of a WCDMA system.

The signal quality measurement may be repeatedly performed for said predetermined number of antennas or beams after a predetermined time period. Thus, any change of the channel quality can be observed and the selection can be adapted based on e.g. the coherence time of the channels.

Preferably, the transmission signal is transmitted via said at least two selected antennas or beams by using a space-time coding scheme. Thus, diversity gain of the space-time coding (open-loop diversity) is increased, since the best channels are used for the transmission. The predetermined number of antennas or beams may be four. The other feedback information may comprise feedback weights used to control the amplitude and/or phase of said transmission signal.

The selection may be performed at said receiving means, and said feedback information may indicate said at least two selected antennas or beams. Said at least two selected antennas or beams may have the least attenuation in their associated radio channels.

The feedback information may consist three bits. Thus, one out of six possible different channel combinations can be signaled to the transmitting end, which is required in case two channels are selected from four.

Alternatively, the selection may comprises a pre-selection performed at said receiving means and a subsequent final selection at the transmitting end. Thereby, other considerations known at the transmitting end can be taken into account. In particular, the final selection may be based on said feedback information and an additional signal quality measurement in the opposite transmission direction. As an alternative, said final selection may be based on said feedback information, an amplifier load condition of channels associated with said at least two selected antennas, and a degree of interference to co-channel users of said associated channels.

Additionally, said final selection may be based on a statistical information indicating a degree of involvement of a selected antenna in previous selections. Hence, the selection can be adapted to the transmission situation and history at the transmitting end.

Furthermore, the selection may be performed by using an evaluation or cost function based on a scoring system. Thus, the selection can be performed by a straight forward calculation of scores using predetermined equations, wherein selection parameters can be weighted by multiplying the scores of individual selection parameters with predetermined weights.

In the pre-selection case, four bits could be used for the feedback information to thereby signal a higher number of selected channels to the transmitting end so as to perform the final selection based on the signaled selected channels.

Preferably, the antenna or beam may be selected when a channel response of a channel associated with said antenna or beam exceeds a predetermined threshold.

Furthermore, said other feedback information may be transmitted using a feedback signaling of said transmit diversity scheme. Then, said feedback information may be transmitted using at least one feedback bit of said feedback signaling. Thus, the same feedback signal can be used for initial channel selection and subsequent channel control, such that only slight system modification are required for implementation. In particular, the transmit diversity scheme may be an STTD or a TxAA scheme, and said feedback signaling may be performed using any WCDMA feedback channel, e.g. FBI bits of an FSM signal.

Furthermore, an SSDT (Sight Selection Diversity Transmission) signaling may be used for the feedback signaling. In this case, the ID of the SSDT signaling may refer to said at least two selected antennas or beams.

As an alternative, fixed antenna or beam pairs may be selected in said selection step. In this case, only one bit is required for selecting two channel pairs out of four total channels. Thereby, control speed can be increased.

As a further alternative, variable number of antennas or beams may be selected. Then, the space-time coding scheme can be adapted to the number of good channels, to thereby further increase diversity gain.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figures 1, 2:
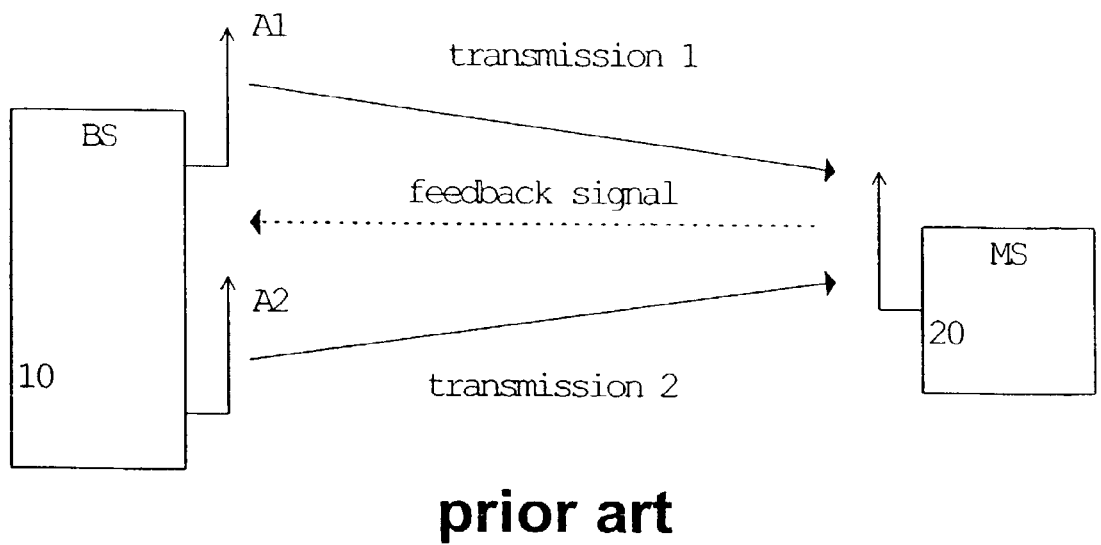
FIG. 1 shows a basic block diagram of a known closed-loop transmit diversity system comprising a base station and mobile station.
FIG. 2 shows a table indicating characteristic parameters of the known STTD and TxAA modes.

In the following, the preferred embodiment of the method and system according to the present invention will be described on the basis of wireless transmission between a base station 10 and a mobile station or terminal 20 of a WCDMA system. According to FIG. 3, the base station 10 comprises an antenna array 19 comprising M antenna elements. It is noted that the antenna array may consist of closely spaced antenna elements (interelement spacing e.g. $\lambda/2$) or widely spaced diversity antennas. The array may also include a phasing network such as a Butler matrix in order to generate beams. Furthermore, antennas with orthogonal polarizations may also be used for other diversity antennas.

The antenna elements of the antenna array 19 are fed by a transceiver TRX 11 which supplies M parallel antenna signals SA1 to SAM to the antenna array 19. The parallel signals SA1 to SAM selected or generated by a selector 12 on the basis of N weighted signals WS1 to WSN supplied from a weighting unit 13. The weighted signals WS1 to WSN are generated by weighting output signals S1 to SN of an ST (space-time) encoder 14 which divides a downlink signal (DL signal) to be transmitted from the network to the terminal or mobile station 20 into the N output signals S1 to SN according to a space-time coding scheme. Thereby, an open-loop transmit diversity is obtained.

The weighting unit 13 applies predetermined transmit weights to at least a part of the parallel signals. The applied transmit weights may be complex weights, i.e. phase and amplitude of the parallel space-time coded signals S1 to SN may be controlled by the weighting unit 12. The transmit weights are controlled by a weight determination unit 17 which sets the weights for individual ones of the parallel signals S1 to SN according to a feedback received by the TRX 11 via a corresponding feedback channel of the WCDMA system (e.g. the FBI field of the DPCCH). Individual feedback signals or weights are extracted by a feedback extracting unit 15 from the frame sequence received by the TRX 11 from the mobile station 20 and supplied to the weight determination unit 17. Thus, a closed-loop control is provided by controlling the transmit weights of individual ones of the N parallel signals 51 to SN based on the feedback information received from the mobile station 20.

In addition thereto, selection control circuit 16 is provided for performing a channel selection based on a channel selection feedback information received from the mobile station 20. The channel selection feedback information is generated at the mobile station 20 based on a signal quality measurement of a predetermined number of channels, e.g. all available transmission channels for transmitting the space-time coded DL signal to the mobile station 20. In, this respect, it is to be noted that the term "channel" may refer to a transmission beam of the antenna array or, alternatively, to a single antenna (element) of the antenna array 19. Thus, the channel selection may be a selection of individual transmission beams generated by the antenna array 19 to thereby control the shape of a resultant beam (i.e. a beamforming operation). Alternatively, the channel selection may be a selection of individual antennas of the antenna array 19 to thereby select the best transmission paths between the antenna array 19 and the mobile station 20. Both kinds of channel selections can be used to achieve a higher transmission gain of the space-time coded DL signal.

Thus, two kinds of feedback information are extracted by the feedback extraction unit, i.e. a feedback weight supplied to the weight determination unit 17 and a channel selection feedback information supplied to the selection control unit 16.

Figure 3:
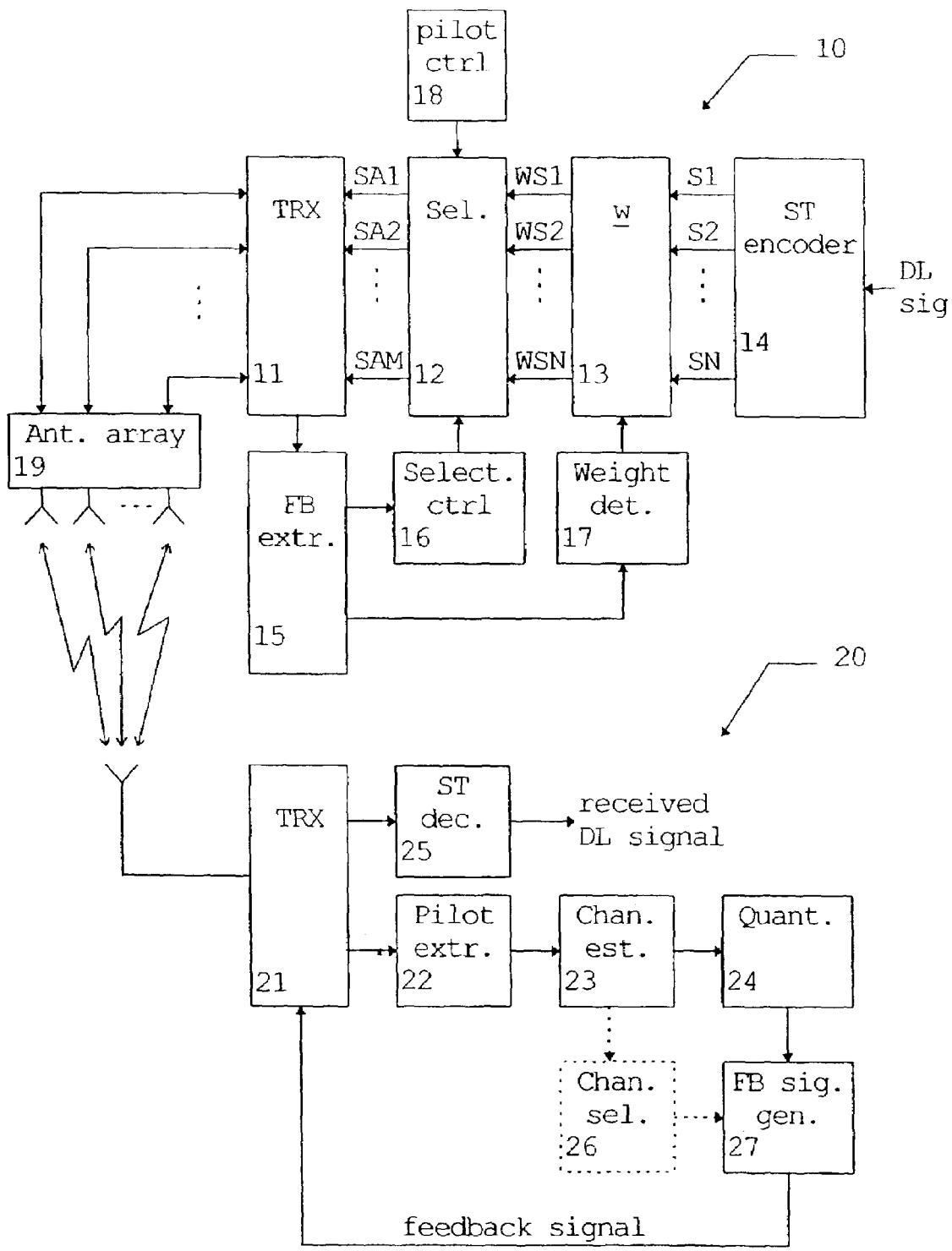
FIG. 3 shows a basic block diagram of a transmit diversity or beamforming system according to the preferred embodiment of the present invention.

In the general case shown in FIG. 3, an N-order space-time coding transmission is performed by selecting N channels for transmission out of M>N available channels.

In the beamforming case, the M channels are defined by M fixed beams which are generated by the antenna array 19. It is noted that the beamforming function may also be achieved digitally in which case the beams do not have to be fixed. Thus, any kind of downlink beamforming can be used. Each one of the signals SA1 to SAM is supplied via the TRX 11 to the antenna array 19 and transmitted via an associated channel (i.e. fixed beam) to the mobile station 20. Each fixed beam may be generated by all antennas of the antenna array 19. Thus, the selection control unit 16 controls the selector 12 based on the channel selection feedback so as to connect or supply the weighted signals WS1 to WSN to those outputs which correspond to the selected N best fixed beams.

In the transmit diversity case, the M channels are defined by M antennas of the antenna array 19. Each one of the signals SA1 to SAM is supplied via the TRX 11 to an associated antenna of the antenna array 19 and transmitted via an associated channel (i.e. transmission path) to the mobile station 20. Thus, the selection control unit 16 controls the selector 12 based on the channel selection feedback so as to connect or supply the weighted signals WS1 to WSN to those outputs which correspond to the selected N best antennas.

Accordingly, the selector 12 can be implemented by a simple switching function for switching the N weighted signals WS1 to WSN to N of its M output terminals.

The feedback information is generated at the mobile station 20 based on channel pilots (CPICH) transmitted from the antenna array 19. The supply of the pilot signals to the predetermined antenna elements is controlled by a pilot control unit 18 which controls the selector 12 so as to supply a corresponding pilot or training sequence generated in the pilot control unit 18 to the respective pilot channels corresponding to the transmission channels (i.e. antennas or fixed beams). Thus, during the signal quality measurement period, the pilot control unit performs control such that pilot channels are used (i.e. pilot signals are transmitted) for all transmission channels from which the best are to be selected. These pilot channels may be secondary pilot channels, e.g. S-CPICHs in WCDMA systems. Then, during the closed-loop control, only those pilot channels are used which correspond to the selected channels. The pilot signals of the selected transmission channels may be primary pilot channels, e.g. CPICHs in WCDMA systems.

The mobile station 20 comprises a transceiver TRX 21 arranged to receive the signals transmitted from the antenna elements of the first and second subarrays SA1 and SA2 and to supply the received and superposed signals to an ST (Space-Time) decoder 25 which decodes or combines the received parallel signals or signal parts in order to obtain the original downlink signal, wherein the combined closed and open-loop transmit diversity scheme leads to a considerable diversity gain.

Furthermore, the mobile station 20 comprises a pilot extraction unit 22 arranged to extract or filter the pilot signals transmitted by the predetermined antenna elements via the pilot channels. The extracted pilot signals (e.g. pilot or training sequences) are supplied to a channel estimation unit 23 which performs a channel estimation according to known estimation procedures based on the pilot signal. The channel estimations are supplied to a quantization unit 24 which may operate according to one of the known closed-loop transmit diversity schemes, e.g. TxAA modes 1 or 2.

The quantized feedback information or parameters (e.g. as indicated in FIG. 2) are supplied via a feedback signal generator 27 to the TRX 21 in order to be transmitted via the corresponding feedback channel (e.g. FBI field of the DPCCH) to the base station 10. Thus, the feedback is based on a quantizing of the measurement or estimation result obtained by the channel estimation unit 23 to thereby achieve the closed-cloop control.

Additionally, the mobile station 20 may comprise an optional channel selection unit 26 which selects the best channels by performing a signal quality measurement based on the channel estimates supplied from the channel estimation unit 23. In particular, a channel may be selected if the channel estimate exceeds a predeterminded threshold. Alternatively, the signal quality measurement may be based on any signal strength, SNR, or SIR measurement or any other signal quality measurement performed in the mobile station 20. The output information of the channel selection unit 26, which indicates the selected channels, is supplied to the feedback signal generator 27.

However, it is noted that the channel selection information may alternatively be derived directly from the quantized feedback weight generated by the quantization unit 24, as long as the quantization unit 24 is capable of providing an output information suitable for selecting N out of M available or desired channels.

It is to be noted that WCDMA terminals usually support only two measurement channels, however this is not critical, since the mobile station or terminal 20 does not need to know the architecture of the base station 10, but only faces certain probing channels. It is then up to the base station 10 to interpret the received feedback correctly. As an example, the pilot control unit 18 can be arranged to change at least one antenna element between successive slots. For example, during a first slot, antenna elements A1 and A2 transmit pilots 1 and 2, during a second slot, antenna elements A1 and A3 transmit these pilots, and so on. This enables the mobile station 20 to measure the channels of all antenna elements while measurements or estimations are performed using only two pilot sequences. However, any hopping pattern can be used for switching the pilots.

Alternatively, code-division-multiplexed pilot signals can be transmitted via the limited number of pilot channels which can be measured or estimated at the mobile station 20.

In the closed-loop control, the transmit weights applied by the weighting unit 13 may be determined so as to control the gain and phase of the signals S1 to SN transmit via the selected N channels. Thus, the transmission power and signal phase supplied to the selected channels can be controlled by the weighting unit 13.

In the open-loop control, the weight determination unit 17 and the weighting unit 13 are not required, since the ST-coded downlink signal is supplied to the selected antenna elements or beams without additional weight control.

Thus, by using the additional channel selection feedback information, the current transmit diversity or beamforming schemes can be extended from N to M antennas per site, while using existing standardized functions, e.g. the initially described STDD or TxAA functions. Preferably, due to the existing functions according to the 3GPP specifications, two channels are preferably selected out of four channels (i.e. N=2 and M=4).

The channel selection may be performed based on two alternative modes.

In a first mode, the mobile station 20 (e.g. channel selection unit 26 or quantization unit 24) selects the N best channels for transmission and informs the base station 10 by transmitting the channel selection feedback information, wherein N is a fixed number. The selected channels can be the antennas or fixed beams with the least attenuation in their associated radio channels. Thus, $$\binom{M}{N} = 6$$

different channel combinations are possible for M=4 and N=2. Three bits are required to convey this information to the base station 10. It is noted that in low mobility environments this feedback information does not need to be transmitted in every time slot, but can be transmitted using e.g. one bit per slot.

In a second mode, the mobile station 20 pre-selects $N_p$ best channels for transmission and informs the base station 10 by using the channel selection feedback information. In the second mode, $N_p$ is a variable number. Thus, the mobile station 10 informs the base station 10 of all channels which are potentially good for transmission, e.g. the associated channel impulse response exceeds the predeterminded threshold. In case of M=4 available transmission channels (i.e. four antennas or four fixed beams), four bits are required to signal all possible channel combinations.

As another adaptive option, the best $N_p$ out of M channels can be selected for transmission, wherein an ST coding scheme (e.g. STTD) of order $N_p$ is applied after each new channel selection. Thus, the open-loop control scheme is adapted to the number of best channels.

In the following, possible channel selection feedback signaling schemes are described for the existing open-loop or closed-loop control schemes based on FIG. 4. In particular, three feedback bits are required to signal a selection of any combination of two (i.e. one channel pair) out of four available channels.

In the STTD mode, the TxAA mode 2 signaling bits, or only a 3-bit FSM command, can be used for signaling a selection of one of all possible channel pairs (i.e. antenna pairs or beam pairs). In case 1 FBI bit is transmitted per slot, 5 FSM commands can be transmitted per frame (one signaling frame comprises 15 slots). If 2 FBI bits are transmitted per slot, then 10 FSM commands can be transmitted per frame.

In the STTD* mode, a simplified channel pair selection is performed, wherein only one bit is used as a feedback information for selecting one channel pair out of two fixed pairs. Thus, 15 FSM commands can be signaled per frame in case of a rate of 1 FBI bit/slot. Alternatively, 30 FSM commands can be signaled per frame in case of a rate of 2 FBI bits/slot.

In the TxAA mode 1, a 4-bit FSM command using TxAA mode 2 bits is signaled, wherein 3 bits are used for channel selection and 1 bit for channel pair control based on a mode 1 feedback. Thus, feedback rates of 4 FSM commands/frame (for 1 FBI bit/slot) or 8 FSM commands/frame (for 2 FBI bits/slot) can be achieved.

In the TxAA mode 1*, the simplified channel pair selection is performed, wherein 1 bit is used for selecting one channel pair out of two fixed pairs, and a second bit is used for channel pair control based on a TxAA mode 1 feedback. Thus, a 2-bit-FSM command is used. In this case, feedback rates of 8 FSM commands/frame (for 1 FBI bit/slot) or 15 FSM commands/frame (for 2 FBI bits/slot) can be achieved.

In the TxAA mode 2, an SSDT feedback signaling can be used, wherein ID here refers to one of the possible channel pairs. An L3 signaling can be used for ID initialization. Thus, a 4-bit FSM command can be used for signaling 4 channel pair control bits, while the three channel pair selection bits are signaled using the SSDT signaling. In this case, a 7-bit-FSM command can be used and feedback rates of 2 FSM commands/frame (for 1 FBI bit/slot) or 4 FSM commands/frame (for 2 FBI bits/slot) can be achieved.

Finally, in the TxAA mode 2*, the simplified channel pair selection is performed, wherein 1 SSDT signaling bit is used for selecting one channel pair out of two fixed pairs, while 4 bits are used for channel pair control. Thus, a 5-bit-FSM command can be used. In this case, feedback rates of 3 FSM commands/frame (for 1 FBI bit/slot) or 6 FSM commands/frame (for 2 FBI bits/slot) can be achieved.

Accordingly, the channel selection feedback control can be accelerated by performing the simplified channel pair selection, i.e. restricting the available channel pairs to a fixed number of two.

It is noted that the control according to the preferred embodiment can be modified by selecting three out of four possible channels or by selecting two out of three possible channels (i.e. M=3, two feedback bits required).

In addition to the above closed-loop feedback considerations, an additional signal amplitude weighting in the weighting unit 13 may be used to remove unbalances between the selected channels.

Figures 4, 5:
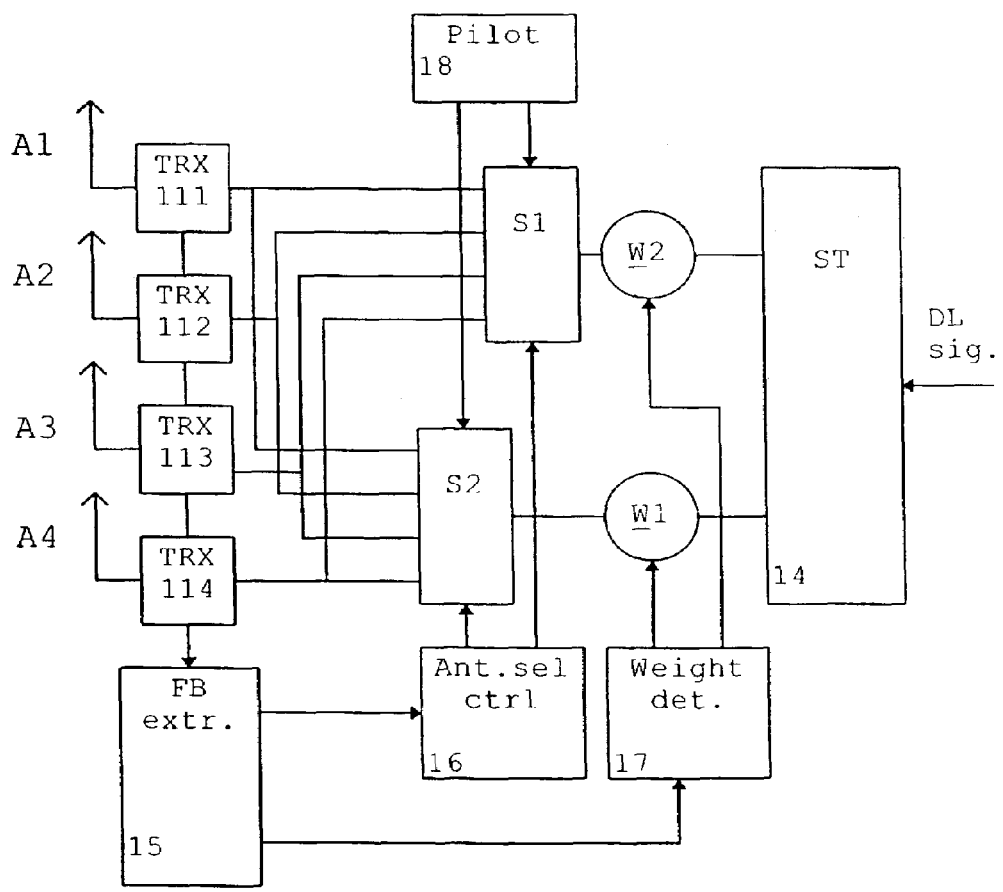
FIG. 4 shows a table indicating the number of selection and control feedback bits in different diversity modes, according to the preferred embodiment of the present invention.
FIG. 5 shows a basic block diagram of a 4-antenna example of the preferred embodiment of the present invention.

The implementation of the above feedback modes according to the table shown in FIG. 4 requires the following changes for the L1 specification. Common pilots (e.g. Primary CPICHs) have to be defined for the $3^{rd}$ and $4^{th}$ antenna. Alternatively, S-CPICHs could be used for each antenna. Furthermore, the usage of the FBI bit has to be redefined as indicated in the table of FIG. 4. If the SSDT signaling is used, the parameter ID shall refer to site antenna pairs instead of different cell sites. Preferably, the ID code could be even shortened.

In the beamforming case, i.e. selection of a pair of fixed beams generated by the antenna array 19, a different S-CPICH is used for each beam. Thus, the mobile station 20 measures the signal quality for each S-CPICH and selects the best beam pair based on the signal qualitys of the S-CPICHs of each beam.

The transmit diversity (open-loop or closed-loop control) is then applied for the selected beam pair. With TxAA mode 1 or 2, the beam shape can be modified (i.e. optimized) by the applied phase weights.

Additionally, in the beamforming case, the selection unit 16 of the base station 20 may use uplink quality measurements in addition to the channel selection feedback to select possibly only one beam at a time.

Furthermore, a final antenna selection may be performed in the selection control unit 16 based on additional considerations relating to the downlink transmission. To achieve this, the power loading of each power amplifier of the TRX 11 associated with the antennas of the antenna array 19 is measured or estimated by the selection control unit 16. In particular, long and short term loading conditions could be considered. Then, the antennas are classified according to their degree of loading.

Furthermore, the selection control unit 16 may estimate the impact of each antenna on any of the remaining co-channel users. Thus, the base station 10 determines a number of "good paths" associated with each of its antennas and intended users sharing the radio channel. The bit-rates (i.e. power) of both the signal to be transmitted and that one of all the co-channel users are taken into account. A simple cost function measuring the interference from different antennas to (at least) the high-bit-rate users can be formed. However, it is noted that any SIR or SNR measurement or the like can be used to perform such a selection.

Then, the final antenna selection for the DL transmission is performed by selecting, whenever possible, the best N antennas which satisfy the conditions of being best from the standpoint of attenuation in the associated channel, power amplifier load situation and interference to other users. This selection can be implemented by forming an evaluation or cost function on scoring base, i.e. a total score is allocated to each antenna depending on the scores obtained in each of the above presented criteria. The N antennas with the highest total scores are then selected for the DL transmission.

As an example, the following scoring system could be implemented.

The score $S_i$ of the i-th antenna (i=1 to M) can be defined as:

$$S_i = s_{MSi} w_1 + s_{Pi} w_2 + s_{Ii} w_3 + s_{Fi} w_4 \quad (1)$$

wherein $s_{MSi}$ denotes the score of the i-th antenna due to the selection of at the mobile station 20, $s_{PI}$ denotes score of the i-th antenna due to the power loading of the i-th power amplifier, $s_{Ii}$ denotes the score of the i-th antenna due to the interference produced by the i-th antenna, and $s_{Fi}$ denotes the score of the i-th antenna due selections in former (i.e. past) transmission bursts. The coefficients $w_1$ to $w_4$ denote scalar weights used to increase (i.e. emphasize) or decrease the effect or impact of each of the above mentioned scores on the total or final score. To allow a fair comparison of the scores, the weights $w_1$ to $w_4$ should in principle the same for each of the M antennas.

In the following the scoring parameters are defined.

$s_{MSi}$=1, if the MS 10 has selected the i-the antenna;

$s_{MSi}$=0, if the MS 10 has not selected the i-the antenna;

$$s_{Pi} = \frac{\overline{P} - P_i}{\overline{P}} \quad (2)$$

wherein $\overline{P}$ denotes the average power of each antenna, e.g. the total mean transmitted power measured over a large time interval divided by the total number M of antennas, and $P_i$ denotes the power corresponding to the i-th power amplifier. However, $\overline{P}$ may as well be defined in other terms, taking into account physical limitations of the power amplifiers. In principle, two scorings can be derived, one for an instantaneous $P_i$ measured during the last burst, and another (long-term or average) $P_i$ measured for the past K bursts. It is noted that the parameter $s_{PI}$ indicates the load of the i-th power amplifier caused by all operating users. If the power in the i-th power amplifier exceeds the average power, then $s_{PI}$ will become a negative number (proportional to the difference) which will decrease the scoring of the i-th antenna, while $s_{PI}$ will increase the scoring of the i-th antenna if the load of the i-th power amplifier is below the average power.

Since the base station 20 knows the channel states corresponding to all users sharing the sector/cell, it can easily determine $s_{Ii}$, a function measuring the cost of using the i-th antenna. The number of good channels corresponding to all the co-channel users that will be interfered if the i-th antenna is selected is an indication of the price to be paid if the i-th antenna is used for transmission. This can be expressed by the following equation:

$$s_{li} - \sum_{}^{K-1} w_{rate} a_i \quad (3)$$

wherein k denotes the total number of co-channel users, $a_i$ is a measure of the "goodness" of the channel from the i-th antenna to a given user ($0 \leq a \leq 1$), and $w_{rate}$ is a scalar weight factor considering the bit-rate (power) of the transmitted signal with respect to that one of the received (interfered) mobile station.

$s_{Fi}$ gives a statistical information of previous selections. Both long- and short-term statistics on past antenna selections can be taken into account for the present selection. Thus, scores can be additionally modified by figures measuring the degree of involvement (i.e. previous selections) of the i-th antenna in the last B bursts, wherein B could be a small number if recent events are considered, a larger number if average behavior is taken into account, or both small and large numbers could be used simultaneously to model short- and long-term cases. In a simplest case, $s_{Fi}$ could be defined as follows:

$$s_{Fi} = \frac{\text{number of selections of } i\text{th antenna in } B \text{ past bursts}}{\text{total number } B \text{ of bursts}} \quad (4)$$

it is noted that the numerator of equation (4) describes the number of antenna selections corresponding only to the desired user. The more often the i-th antenna has been previously selected, the more chances it should have in the present selection (and the higher should be its $s_{Fi}$) and vice versa. The number of bursts to be considered could be varied according to the coherence time of the channel.

Finally, when the score of the M antennas has been computed, the antennas with the n best scores are used for the DL transmission. It is noted that the above scheme operates in a mode where only the mobile station 10 selects the best antennas for transmission, if $w_1 \neq 0$, $w_2 = 0$, $w_3 = 0$, and $w_4 = 0$.

FIG. 5 shows a basic block diagram of an example of a base station 10 according to the preferred embodiment where an antenna pair is selected from an antenna array comprising M=4 antennas A1 to A4. In FIG. 5, components which to those depicted in FIG. 3 are denoted by same reference numbers and have the same functions.

The antennas A1 to A4 are fed by respective transceivers TRX 111 to 114. Furthermore, weights W1 and W2 are applied in respective weighting units provided in the transmission paths leading to selectors S1 and S2. A weight determination unit 17 is arranged to control the weights W1 and W2 so as to apply predetermined weights to two parallel ST-coded signals generated by an ST encoder 14 on the basis of a supplied DL signal. The weights W1 and W2 may be applied by known controllable attenuation elements or networks and/or known controlled delay or phase shifting networks or elements, so as to achieve the required gain and/or phase shift.

In the example shown in FIG. 5, each antenna of an antenna pair selected by the selectors S1 and S2 based on control signals supplied from an antenna selection control unit 16 can be controlled separately by using any one of the two-antenna feedback modes defined in FIG. 4. The feedback extraction unit 15 extracts an antenna selection feedback information from the received feedback signal and supplies it to the antenna selection control unit 16. The antenna selection control unit 16 generates corresponding control signals so as to control the selectors S1 and S2 to switch the two weighted ST-coded signals to the selected antenna pair. The control signals are generated in a manner such that a selection of the same antenna by both selectors S1 and S2 is prevented.

The pilot control unit 18 supplies pilot signals via the selectors S1 and S2 to the antennas A1 to A4. During the signal quality measuring operation, the antenna selection control unit 16 may control one of the selectors S1 and S2 in such a manner that the pilot signals are supplied to all antennas A1 to A4. After the selection, the pilot signals are only switched to the selected antenna pairs in order to perform the 2-antenna closed-loop control with higher power efficiency.

As already mentioned in connection with FIG. 3, an open-loop control might be possible as well, wherein the weight control (i.e. blocks 13 and 17)) can be omitted.

Figure 6:
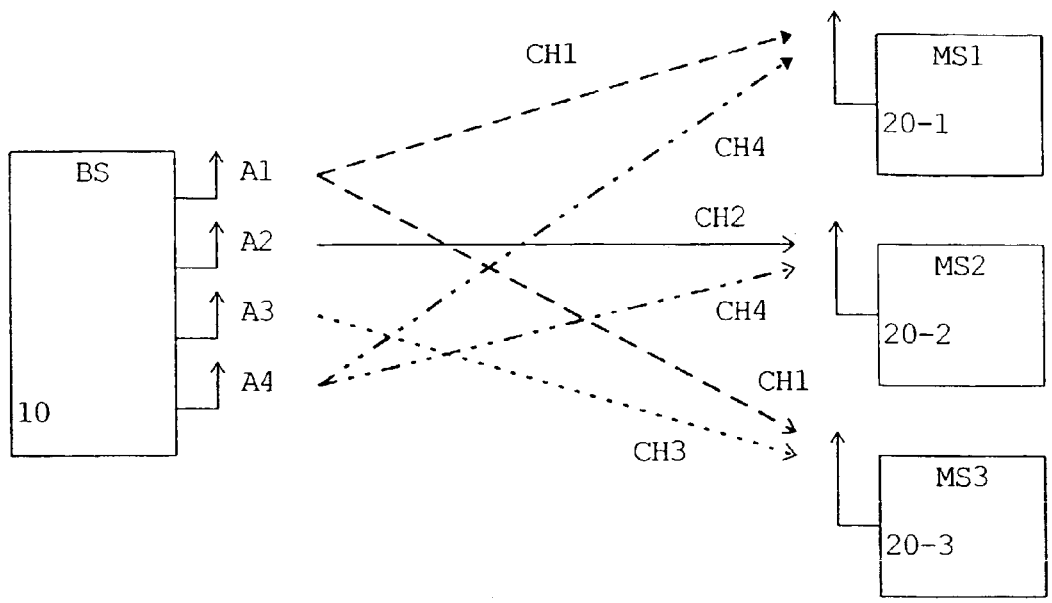
FIG. 6 shows a basic scheme for explaining a 4-antenna transmit diversity system according to the preferred embodiment.

FIG. 6 shows a basic antenna selection scheme for a 4-antenna transmission system comprising a base station 10, e.g. as shown in FIG. 5, where the best two antennas are selected for each of three mobile stations 20-1 to 20-3 based on respective channel selection feedback signals transmitted from the mobile stations 20-1 to 20-3 to the base station 10. In the present case shown in FIG. 6, a first mobile station 20-1 has selected antennas A1 and A4 (i.e. channels CH1 and CH4) which are then controlled based on the open-loop (i.e. ST coding) and/or closed-loop (i.e. respective feedback weights) control. Furthermore, a second base station 20-2 has selected antennas A2 and A4 (i.e. channels CH2 and CH4) for transmission control, and a third mobile station 20-3 has selected antennas A1 and A3 (i.e. channels CH1 and CH3) for transmission control. Thereby, the 2-antenna diversity gain can be enhanced by selecting the two best from the four antennas A1 to A4.

Figure 7:
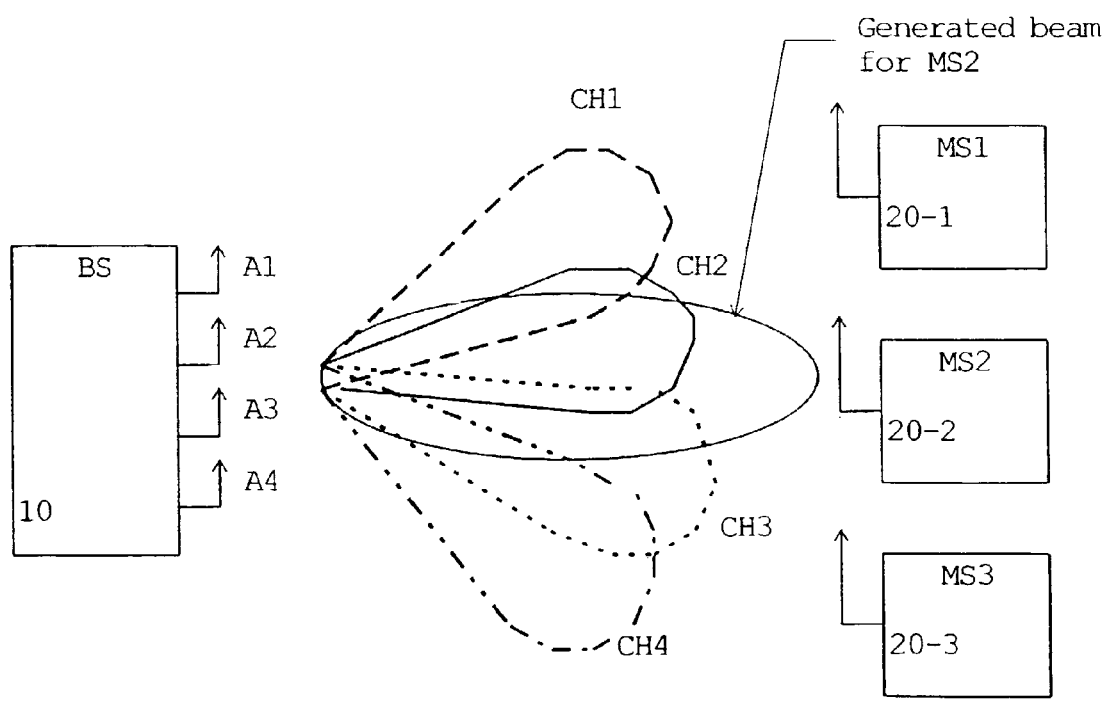
FIG. 7 shows a basic scheme for explaining a 4-antenna beamforming system according to the preferred embodiment.

FIG. 7 shows an alternative basic beamforming scheme for a 4-antenna transmission system comprising a base station 10, where the antenna array consisting of the four antennas A1 to A4 is arranged to generate four fixed beams (i.e. channels CH1 to CH4) which can be selected e.g. by the two selectors S1 and S2 shown in FIG. 5. However, contrary to the example shown in FIG. 5, an additional controllable phase shifting network (not shown) is required between the transceivers 111 to 114 and the antennas A1 to A4. The phase shifting network is arranged to divide each of the output signals of the transceivers 111 to 114 into four antenna signals and to apply individual phase shifts (or delays) to the antenna signals before supplying them to the antennas A1 to A4. The amounts of phase shifts are controlled so as generate four predetermined fixed beams (i.e. channels CH1 to CH4), wherein each of the fixed beams corresponds to one of the output signals of the transceivers 111 to 114. Hence, by controlling the switching operation of the selectors S1 and S2 according to the channel selection feedback information received from the mobile stations 20-1 to 20-3, the ST-coded DL signal can be supplied to two individual ones of the transceivers 111 to 114 and thus to two individual fixed beams. Optionally, the two selected fixed beams may then be controlled by the feedback weights so as to optimize the shape of the generated total beam formed by the two selected fixed beams.

In the present case shown in FIG. 7, the second mobile station 20-1 has selected the fixed beams of the channels CH2 and CH3 which are then controlled based on respective feedback weights so as to generate a resultant optimized beam in order to maximize the transmission gain. In particular, the selectors S1 and S2 are controlled so as to supply the ST-coded parallel signals via the transceivers 112 and 113 to respective input terminals of the phase shifting network (not shown). The same beamforming operation may be performed for the two other mobile stations 20-1 and 20-3 shown in FIG. 7, such that optimized resultant beams are also generated for the mobile stations 20-1 and 20-3. It is noted that the fixed beams of the channels CH1 to CH4 can be arranged so that the fixed beams of the channels CH1 and CH2 are orthogonally polarized with respect to the fixed beams of the channels CH3 and CH4.

Figure 8:
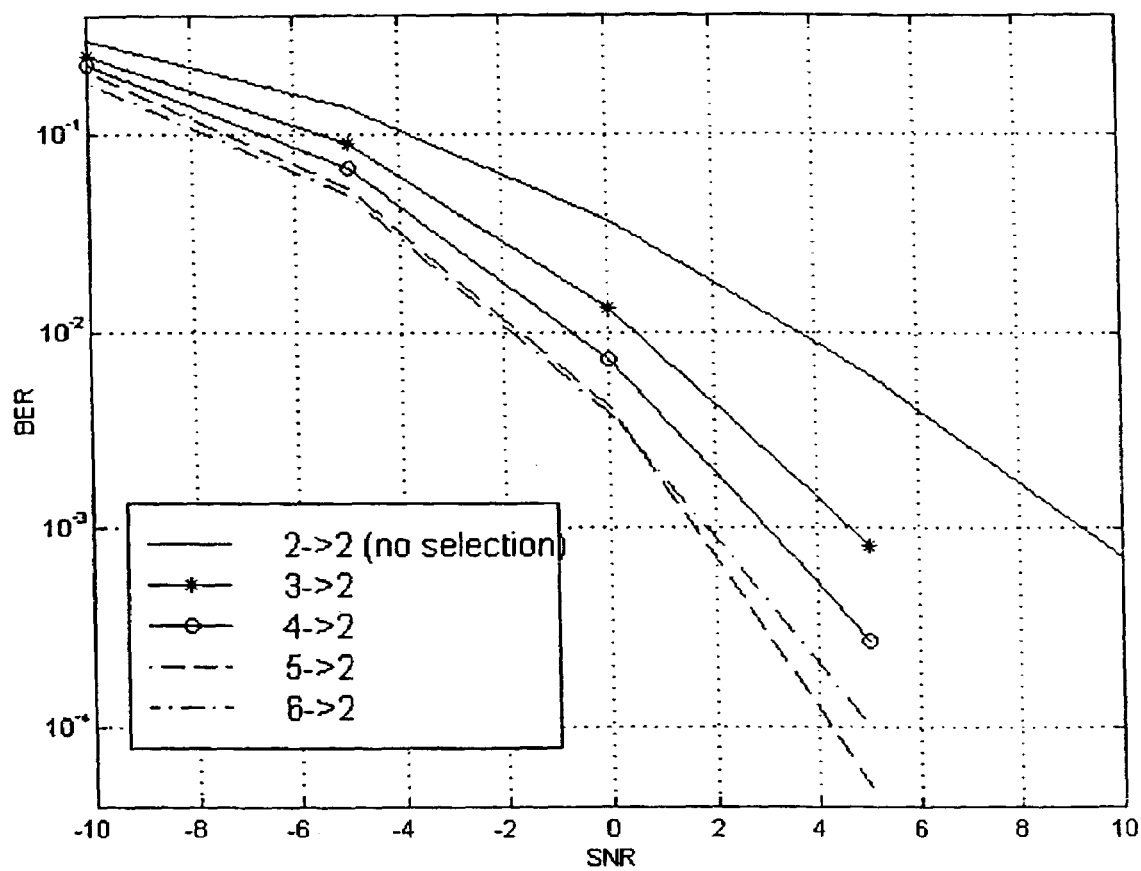
FIG. 8 shows a diagram indicating simulation results of an N-to-2 antenna selection for N=2 to 6.

FIG. 8 shows a diagram indicating simulation results confirming the gains achievable by the selection feedback according to the present invention. In particular, the diagram shows a raw BER (Bit Error Rate) performance for a mobile station at a speed of 50 km/h. Specific cases of M-to-2 antenna selections were simulated for N=2, 3, 4, 5, and 6. It is noted that the case M=2 corresponds to a simple STTD case without any channel pre-selection. As can be gathered from FIG. 8, significant reductions in BER can be achieved up to M=5, while the simulation result for M=6 indicates that no significant further BER improvements can be expected beyond M=5. Thus, an antenna array comprising a maximum number of 5 antennas should be selected depending on the desired degree of complexity.

In summary, the present invention relates to a method and system for transmitting a transmission signal from an antenna array 19 to a receiving means 20 of a wireless communication system, wherein a signal quality measurement is performed at the receiving means 20 for predetermined antennas or beams of said antenna array 19. Based on a feedback information derived from the signal quality measurement, at least two of the predetermined antennas or beams of the antenna array 19 are selected. The selected antennas or beams are used for transmitting said transmission signal according to a transmit diversity or beamforming scheme. Thus, spectral efficiency and diversity gain can be enhanced by using only selected ones of the predetermined antennas or beams.

The present invention is not limited to the above preferred embodiments but can be applied to any multi-antenna transmitter in order to provide an increased system capacity or spectral efficiency. The feedback signaling can be performed according to any signaling or quantization concept suitable for obtaining transmit weights and the channel selection feedback information at the base station 10.

Moreover, the present invention may be applied to any wireless communication system comprising a transmit diversity or transmit beamforming concept used between a transmitting element and at least one receiver. Therefore, the above description of the preferred embodiment and the accompanying drawings are only intended to illustrate the present invention. The preferred embodiment of the invention may be varied within the scope of the attached claims.

What is claimed is:

1. A method for transmitting a transmission signal from an antenna array to a receiving means of a wireless communication system, said method comprising the steps of:
   a) performing a signal quality measurement at said receiving means for predetermined antennas or beams of said antenna array;
   b) selecting at least two of said predetermined antennas or beams of said antenna array based on feedback information derived from said signal quality measurement; and
   c) using said at least two selected antennas or beams for transmitting said transmission signal according to a transmit diversity or beamforming scheme;

wherein said selection comprises a pre-selection performed at said receiving means and a subsequent final selection at a transmitting end;
   wherein said final selection is based on a scoring system which takes into account said feedback information, an amplifier load condition of channels associated with said at least two selected antennas, and a degree of interference to co-channel users of said associated channels;
   wherein the scoring system is implemented by defining final scores of said at least two selected antennas, the final scores being defined by scores for respective antennas of said at least two selected antennas, the scores for the respective antennas including a score of a respective antenna due to a selection by the receiving means, the score of a power loading of a power amplifier of the respective antenna, the score of interference produced by the respective antenna and the score of a selection of the respective antenna in former transmission bursts; and
   weighting the scores and summing up the weighted scores so as to form a final score for the respective antenna.

2. The method of claim 1, wherein said at least two selected antennas or beams are controlled based on at least another feedback information received from said receiving means.

3. The method of claim 2, wherein said other feedback information is generated based on a channel estimation using respective pilot signals transmitted via said at least two selected antennas or beams.

4. The method of claim 3, wherein said respective pilot signals are transmitted via a CPICH of a WCDMA system.

5. The method of claim 1, wherein said signal quality measurement is performed by measuring a signal strength, SNR or SIR using respective pilot signals transmitted via each of said predetermined antenna elements or beams.

6. The method of claim 5, wherein said respective pilot signals are-transmitted via a secondary pilot channel.

7. The method of claim 6, wherein said secondary pilot channel is an S-CPICH of a WCDMA system.

8. The method of claim 1, wherein said signal quality measurement is repeatedly performed for said predetermined number of antennas or beams after a predetermined time period so as to achieve an adaptive selection.

9. The method of claim 1, wherein said transmission signal is transmitted via said at least two selected antennas or beams by using a space-time coding scheme.

10. The method of claim 1, wherein said predetermined number of antennas or beams is four.

11. The method of claim 1, wherein said feedback information is transmitted using a WCDMA feedback channel.

12. The method of claim 11, wherein said at least two selected antennas or beams have least attenuation in their associated radio channels.

13. The method of claim 1, wherein said feedback information consists of at least one bit.

14. The method of claim 1, wherein said selection is performed at said receiving means, and said feedback information indicates said at least two selected antennas or beams.

15. The method of claim 1, wherein said final selection is based on said feedback information and an additional signal quality measurement in the opposite transmission direction.

16. A method according to claim 1, wherein said subsequent final selection is based on statistical information indicating a degree of involvement of a selected antenna in previous selections.

17. The method of claim 1, wherein said selection is performed by using an evaluation or cost function based on a scoring system.

18. The method of claim 1, wherein an antenna or beam is selected in said selection step when a channel response of a channel associated with said antenna or beam exceeds a predetermined threshold.

19. The method of claim 2, wherein said other feedback information is transmitted using feedback signaling of said transmit diversity scheme.

20. The method of claim 19, wherein said feedback information is transmitted using at least one feedback bit of said feedback signaling.

21. The method of claim 19, wherein said transmit diversity scheme is a WCDMA transmit diversity scheme.

22. The method of claim 21, wherein said WCDMA transmit diversity scheme is an STTD or TxAA scheme or a combination thereof.

23. The method of claim 19, wherein said feedback signaling is performed using FBI bits of an FSM signal of a WCDMA system.

24. The method of claim 19, wherein an SSDT signaling is used for said feedback signaling.

25. The method of claim 24, wherein an ID of said SSDT signaling refers to said at least two selected antennas or beams.

26. The method of claim 1, wherein fixed antenna or beam pairs are selected in said selection step.

27. The method of claim 1, wherein said other feedback information comprises feedback weights used to control at least one of an amplitude and phase of said transmission signal.

28. The method of claim 1, wherein a variable number of antennas or beams are selected in said selection step.

29. A system for transmitting a transmission signal from an antenna array to a unit configured to receive of a wireless communication system, said system comprising:
   a) a unit configured to measure a signal quality at said unit configured to receive for predetermined antennas or beams of said antenna array;
   b) a unit configured to select at least two of said predetermined antennas or beams of said antenna array based on feedback information derived from said signal quality measurement; and
   c) a unit configured to transmit said transmission signal using said at least two selected antennas or beams according to a transmit diversity or beamforming scheme;
   wherein said unit configured to select comprises a preselection unit arranged at said unit configured to receive and a final selection unit arranged at a transmitting end;
   wherein said final selection unit is arranged to perform selection based on a scoring system which takes into account said feedback information, an amplifier load condition of channels associated with said at least two selected antennas, and a degree of interference to co-channel users of said associated channels;
   wherein the scoring system is implemented by defining final scores of said at least two selected antennas, the final scores being defined by scores for respective antennas of said at least two selected antennas, the scores for the respective antennas including a score of a respective antenna due to a selection by the unit configured to receive, the score of a power loading of a power amplifier of the respective antenna, the score of interference produced by the respective antenna and the score of a selection of the respective antenna in former transmission bursts; and
   the system being configured to weight the scores and to sum up the weighted scores so as to form a final score for the respective antenna.

30. The system of claim 29, further comprising a unit configured to control said at least two selected antennas or beams based on at least another feedback information received from said receiving unit.

31. The system of claim 29, further comprising a pilot unit configured to generate pilot signals transmitted via said predetermined antennas or beams of said antenna array.

32. The system of claim 29, further comprising a feedback extraction unit configured to filter said feedback information and for supplying the filtered feedback information to said unit configured to select.

33. The system of claim 32, wherein said feedback extraction unit is arranged to filter other feedback information received from said unit configured to receive and to supply the filtered other feedback information to a weight determination unit of said control unit.

34. The system of claim 31, wherein said pilot control unit is arranged to perform control such that said pilot signals are transmitted via a CPICH channel.

35. The system of claim 31, wherein said unit configured to measure is arranged to measure a signal strength, SNR, or SIR by using respective pilot signals transmitted via each of said predetermined antenna elements or beams.

36. The system of claim 35, wherein said pilot control unit is arranged to perform control such that said respective pilot signals are transmitted via a secondary pilot channel.

37. The system of claim 36, wherein said secondary pilot channel is an S-CPICH of a WCDMA system.

38. The system of claim 29, wherein said unit configured to measure is arranged to perform said signal quality measurement repeatedly for said predetermined number of antennas or beams after a predetermined time period.

39. The system of claim 29, further comprising a nit configured to encode said transmission signal by using a space-time coding scheme, wherein said unit configured to transmit is arranged to transmit the space-time coded transmission signal via said at least two selected antennas or beams.

40. The system of claim 29, wherein said unit configured to select is arranged at said unit configured to receive, and wherein said feedback information indicates said at least two selected antennas or beams.

41. The system of claim 40, wherein said unit configured to select is arranged to select at least two antennas or beams having least attenuation in their associated radio channels.

42. The system of claim 29, wherein said final selection unit is arranged to perform selection based on said feedback information and an additional sign.

43. The system of claim 29, wherein said final selection unit is arranged to perform selection based on statistical information indicating a degree of involvement of a selected antenna in previous selections.

44. The system of claim 29, wherein said final selection unit is arranged to perform selection by using an evaluation or cost function based on a scoring system.

45. The system of claim 29, wherein an antenna or beam is selected by said unit configured to select when a channel response of a channel associated to said antenna or beam exceeds a predetermined threshold.

46. The system of claim 30, wherein said receiving unit comprises a feedback generating unit configured to generate said another feedback information based on a channel estimation performed using respective pilot signals transmitted via said at least two selected antennas or beams.

47. The system of claim 46, wherein said feedback generating unit is arranged to transmit said another feedback information by using feedback signaling of said transmit diversity scheme.

48. The system of claim 47, wherein said feedback generating unit is arranged to transmit said another feedback information by using at least one feedback bit of said feedback signaling.

49. The system of claim 47, wherein said transmit diversity scheme is an STTD or TxAA scheme or a combination of these.

50. The system of claim 47, wherein said feedback generating unit is arranged to transmit said another feedback information by using a WCDMA feedback channel.

51. The system of claim 50, wherein said feedback signaling is performed using FBI bits of an FSM signal.

52. The system of claim 46, wherein said feedback generating unit is arranged to use an ID of an SSDT signaling to refer to said at least two selected antennas or beams.

53. The system of claim 29, wherein said means configured to select is arranged to select fixed antenna or beam pairs.

54. The system of claim 30, wherein said control unit is arranged to control at least one of an amplitude and phase of said transmission signal.

55. The system of claim 29, wherein said means configured to select is arranged to select a variable number of antennas or beams.

56. The system of claim 29, wherein said unit configured to receive is a mobile station and said antenna array is arranged at a base station of a WCDMA system.

57. A base station for transmitting a transmission signal from an antenna array to a unit configured to receive of a wireless communication system, comprising:

a) a unit configured to select at least two predetermined antennas or beams of said antenna array based on feedback information derived from a signal quality measurement; and b) a unit configured to transmit said transmission signal using said at least two selected antennas or beams according to a transmit diversity or beamforming scheme;

wherein said unit configured to select comprises a final selection unit arranged at the base station;

wherein said final selection unit is arranged to perform selection based on a scoring system which takes into account said feedback information, an amplifier load condition of channels associated with said at least two selected antennas, and a degree of interference to co-channel users of said associated channels;

wherein the scoring system is implemented by defining final scores of said at least two selected antennas, the final scores being defined by scores for respective antennas of said at least two selected antennas, the scores for the respective antennas including a score of a respective antenna due to a selection by the unit configured to receive, the score of a power loading of a power amplifier of the respective antenna, the score of interference produced by the respective antenna and the score of a selection of the respective antenna in former transmission bursts; and the base station being configured to weight the scores and to sum up the weighted scores so as to form a final score for the respective antenna.

* * * * *